United States Patent
Kotake et al.

(10) Patent No.: US 10,379,136 B2
(45) Date of Patent: Aug. 13, 2019

(54) LASER RADAR DEVICE

(71) Applicant: Mitsubishi Electric Corporation, Chiyoda-ku (JP)

(72) Inventors: Nobuki Kotake, Tokyo (JP); Masaharu Imaki, Tokyo (JP); Shumpei Kameyama, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/781,173

(22) PCT Filed: Dec. 10, 2015

(86) PCT No.: PCT/JP2015/084609
§ 371 (c)(1),
(2) Date: Jun. 4, 2018

(87) PCT Pub. No.: WO2017/098623
PCT Pub. Date: Jun. 15, 2017

(65) Prior Publication Data
US 2018/0356440 A1 Dec. 13, 2018

(51) Int. Cl.
*G01P 3/36* (2006.01)
*G01P 5/26* (2006.01)
(Continued)

(52) U.S. Cl.
CPC ............... *G01P 5/26* (2013.01); *G01F 1/661* (2013.01); *G01P 3/36* (2013.01); *G01S 7/4808* (2013.01);
(Continued)

(58) Field of Classification Search
CPC ... G01P 5/26; G01P 3/36; G01F 1/661; G01S 7/4808; G01S 7/497; G01S 17/023; G01S 17/58; G01S 17/95; Y02A 90/19
See application file for complete search history.

(56) References Cited

U.S. PATENT DOCUMENTS

2014/0300888 A1    10/2014    Duffey et al.

FOREIGN PATENT DOCUMENTS

JP    10-68771 A        3/1998
JP    2005-326297 A    11/2005
(Continued)

OTHER PUBLICATIONS

Extended European Search Report dated Nov. 23, 2018 in Patent Application No. 15910239.1, 8 pages.
(Continued)

*Primary Examiner* — Samantha K Abraham
(74) *Attorney, Agent, or Firm* — Oblon, McClelland, Maier & Neustadt, L.L.P.

(57) ABSTRACT

The problem with a conventional laser radar device is that the SNR of a value of a wind speed degrades due to motion. A laser radar device according to the present disclosure includes: an optical oscillator to emit laser light; an optical modulator to modulate the laser light generated by the optical oscillator; an optical antenna to emit the laser light modulated by the optical modulator into the air, and to receive, as received light, scattered light scattered by an irradiation target; an optical receiver to perform heterodyne detection on the received light received by the optical antenna; a sensor to detect one or more motion amounts of the optical antenna; and a signal processor to calculate spectra of respective received signals obtained by the heterodyne detection performed by the optical receiver, to correct the spectra by using the one or more motion amounts detected by the sensor, to perform an integration of the corrected spectra, and to calculate a speed of the irradiation target from a spectrum resulting from the integration.

6 Claims, 15 Drawing Sheets

(51) Int. Cl.
G01S 17/58 (2006.01)
G01S 17/95 (2006.01)
G01S 17/02 (2006.01)
G01S 7/497 (2006.01)
G01F 1/66 (2006.01)
G01S 7/48 (2006.01)

(52) U.S. Cl.
CPC ............ *G01S 7/497* (2013.01); *G01S 17/023* (2013.01); *G01S 17/58* (2013.01); *G01S 17/95* (2013.01); *Y02A 90/19* (2018.01)

(56) References Cited

FOREIGN PATENT DOCUMENTS

| | | |
|---|---|---|
| JP | 2012-103050 A | 5/2012 |
| JP | 2013-253910 A | 12/2013 |
| JP | 2014-55889 A | 3/2014 |
| JP | 2015-502540 A | 1/2015 |

OTHER PUBLICATIONS

Leaf A. Jiang, et al., "Laser Vibrometry from a Moving Ground Vehicle" Applied Optics, Optical Society of America, vol. 50, No. 15, XP001563240, May 20, 2011, pp. 2263-2273.

International Search Report dated Mar. 15, 2016 in PCT/JP2015/084609 filed Dec. 10, 2015.

L. Tian et al., "3D Wind Retrieval From Downward Conical Scanning Airborne Doppler Radar", 35$^{th}$ Conference on radar meteorology, Sep. 26-30, 2011, pp. 1-8.

LASER RADAR DEVICE

TECHNICAL FIELD

The present disclosure relates to a laser radar device.

BACKGROUND ART

A laser radar device, as it is known, emits laser light into the air and receives scattered light reflected by fine liquid or solid particles (aerosols) floating in the air, to calculate a wind speed. A possible use of this laser radar device is mounting on an unsteadily moving platform such as an airplane or a floating body on the ocean. Usually, such a platform unsteadily moves due to an external factor such as a wind or a wave.

For example, a conventional laser radar device mounted in a platform is disclosed by Patent Literature 1. The conventional laser radar device performs a Fourier transform on scattered light scattered by aerosols in the air for each time, thereby to calculate frequency spectra of the scattered light for respective times. After that, an integration of the frequency spectra for respective times is performed, and the value of a wind speed in a line-of-sight direction is calculated from the peak value of a frequency spectrum resulting from the integration. For the value of the wind speed calculated from the frequency spectrum resulting from the integration, the motion amount is compensated for, and thereby a value of the wind speed in which the influence of the motion is filtered out is obtained. In this way, the conventional laser radar device performs compensation for the motion. The motion amount for use in the compensation is the average of motion amounts over a period of time during which the integration is performed.

CITATION LIST

Patent Literature

Japanese Pat Application Publication No. 2013-253910.

SUMMARY OF INVENTION

Technical Problem

However, with the conventional laser radar device, there is the problem that, since the integration of the frequency spectra for respective times is performed before the motion amount is compensated for, the width of the peak of a frequency spectrum resulting from the integration becomes large. The reason why the width of the peak of the frequency spectrum becomes large is that the integration of frequency spectra having different peaks is performed because motion amounts for respective times are different from one another and the peak of the frequency spectrum affected by the difference varies with time. In this way, in the conventional laser radar device, the peak value to noise, i.e., the SNR (Signal to Noise Ratio) degrades due to the large width of the peak of the frequency spectrum.

Solution to Problem

In accordance with the present disclosure, there is provided a laser radar device which includes: an optical oscillator to emit laser light; an optical modulator to modulate the laser light emitted by the optical oscillator; an optical antenna to emit the laser light modulated by the optical modulator into air, and to receive, as received light, scattered light scattered by an irradiation target; an optical receiver to perform heterodyne detection on the received light received by the optical antenna; a sensor to detect one or more motion amounts of the optical antenna; and a signal processor to calculate spectra of respective received signals being obtained by the heterodyne detection performed by the optical receiver, to correct the spectra by using one or more motion amounts detected by the sensor, to perform integration of the corrected spectra, and to calculate a speed of the irradiation target from a spectrum resulting from the integration.

Advantageous Effects of Invention

According to the present disclosure, an effect of suppressing of the degradation in the SNR due to the motion of the laser radar device is achieved.

DESCRIPTION OF EMBODIMENTS

Embodiment 1

Figure 1:
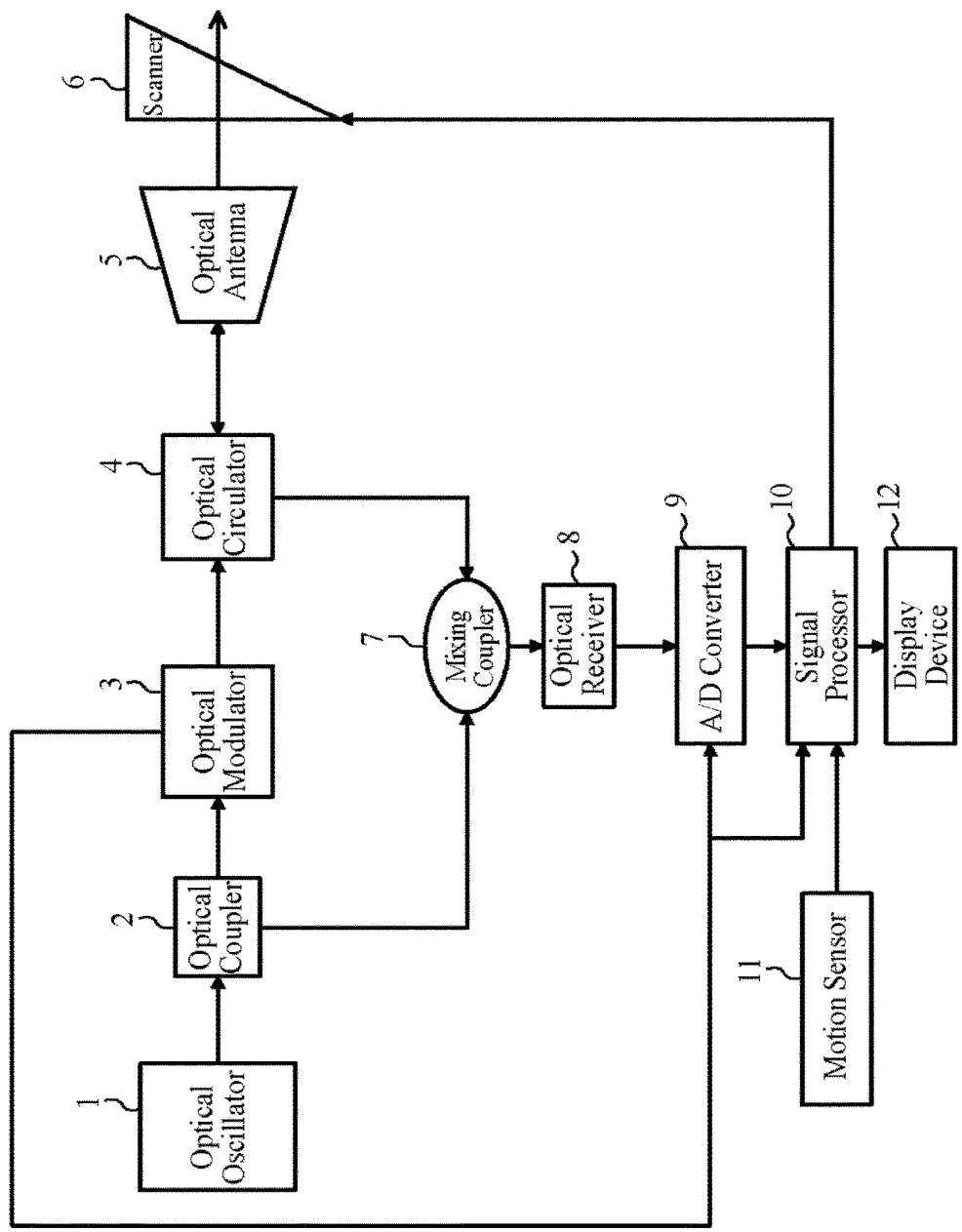
FIG. 1 is a block diagram, showing an example of the configuration of a laser radar device according to Embodiment 1 of the present disclosure.

FIG. 1 is a block diagram showing an example of the configuration of a laser radar device according to Embodiment 1 of the present disclosure.

This laser radar device includes an optical oscillator 1 (an example of an optical oscillator), an optical coupler 2, an optical modulator 3 (an example of an optical modulator), an optical circulator 4, an optical antenna 5 (an example of an optical antenna), a scanner 6 (an example of a scanner), a mixing coupler 7, an optical receiver 8 (an example of an optical receiver), an A/D converter (Analogue-to-Digital converter) (an example of an analog-to-digital converter), a signal processor 10, a motion sensor 11 (an example of a sensor), and a display device 12.

The optical oscillator 1 emits laser light. The optical oscillator 1 is connected to the optical coupler 2, and outputs the emitted laser light to the optical coupler 2. For example, as the optical oscillator 1, a semiconductor laser, a solid state laser, or the like is used.

The optical coupler 2 splits the laser light outputted by the optical oscillator 1 into local light and transmission light. The local light refers to light passing through a path extending from the optical coupler 2, via the mixing coupler 7, to the optical receiver 8, and the transmission light refers to light passing through a path extending from the optical coupler 2, via the optical modulator 3, to the optical antenna 5. The optical coupler 2 is connected to the optical oscillator 1, the optical modulator 3, and the mixing coupler 7, and outputs the local light to the mixing coupler 7 and also outputs the transmission light to the optical modulator 3. For example, as the optical coupler 2, a fused fiber coupler, a filter type coupler using a dielectric multilayer film filter, or the like is used.

The optical modulator 3 shifts the frequency of the transmission light outputted by the optical coupler 2. The optical modulator 3 is connected to the optical coupler 2, the optical circulator 4, the A/D converter 9, and the signal processor 10. The optical modulator 3 performs frequency modulation and intensity modulation on the transmission light, to shift the frequency of the transmission light, and also modulates the transmission light into pulses. The optical modulator 3 also outputs a pulse trigger signal showing a pulse timing when the transmission light is modulated into a pulse, to both the A/D converter 9 and the signal processor 10. The pulse trigger signal is, for example, a TTL (Transistor-Transistor Logic) signal with 5V. For example, as the optical modulator 3, an AO frequency shifter (Acoustic Optical Frequency Shifter), an optical phase modulator, or the like is used.

The optical circulator 4 separates the transmission light modulated by the optical modulator and received light acquired via both the scanner 6 and the optical antenna 5. Here, the received light is part of the transmission light which is scattered by aerosols. The optical circulator 4 is connected to the optical modulator 3, the optical antenna 5, and the mixing coupler 7, and outputs the transmission light to the optical antenna 5 and also outputs the received light to the mixing coupler 7. For example, as the optical circulator 4, a circulator of space propagation type or fiber coupling type which is configured using a wavelength plate and a beam splitter is used.

The optical antenna 5 outputs the transmission light outputted by the optical circulator 4, and receives, as received light, light scattered by aerosols. The optical antenna 5 is connected to the optical circulator 4 and the scanner 6, and outputs the transmission light to the scanner 6 and also outputs the received light to the optical circulator 4. For example, as the optical antenna 5, an optical telescope or a camera lens is used.

The scanner 6 scans the air with the transmission light outputted by the optical antenna 5, to change the direction in which the transmission light is emitted into the air (also referred to as the line-of-sight direction). The scanner 6 includes a wedge prism, a motor for rotating the wedge prism, and an encoder. As the motor, for example, a stepping motor with an encoder is used. The scanner 6 control the motor to rotate at an arbitrary speed, to change the line-of-sight direction of the wedge prism, and also outputs angle information showing an angle at which the transmission light is emitted to the signal processor 10. For example, as the scanner 6, a wedge prism mirror, a galvano scanner, or the like is used.

The mixing coupler 7 mixes the local light and the received light. The mixing coupler 7 is connected to the optical coupler 2, the optical circulator 4, and the optical receiver 8. The mixing coupler 7 mixes the local light outputted by the optical coupler 2 and the received light outputted by the optical circulator 4, and outputs the resulting mixed light to the optical receiver 8. For example, as the mixing coupler 7, a fused fiber coupler, a filter type coupler using a dielectric multilayer film filter, or the like is used.

The optical receiver 8 performs heterodyne detection on the mixed light outputted by the mixing coupler 7. The optical receiver 8 is connected to the mixing coupler 7 and the A/D converter 9. The optical receiver 8 performs heterodyne detection on the mixed light outputted by the mixing coupler 7, converts the detected light signal into an electric signal, and outputs the electric signal to the A/D converter 9. For example, as the optical receiver 8, a balanced receiver or another similar device is used.

The A/D converter 9 converts the analog signal which the optical receiver 8 acquires by performing the heterodyne detection into a digital signal. The A/D converter 9 is connected to the optical receiver 5, the optical modulator 3, and the signal processor 10. The A/D converter 9 samples the analog electric signal outputted b the optical receiver 8 by using, as a trigger, the laser pulse trigger signal outputted by the optical modulator 3, converts the analog signal into a digital signal, and outputs this digital signal to the signal processor 10. For example, as the A/D converter 9, a double integral type A/D converter, a successive approximation type A/D converter, a parallel comparison type A/D converter, or the like is used.

The signal processor 10 performs signal processing on the digital signal outputted by the A/D converter 9, to calculate a wind vector subjected to motion compensation.

Figure 2:
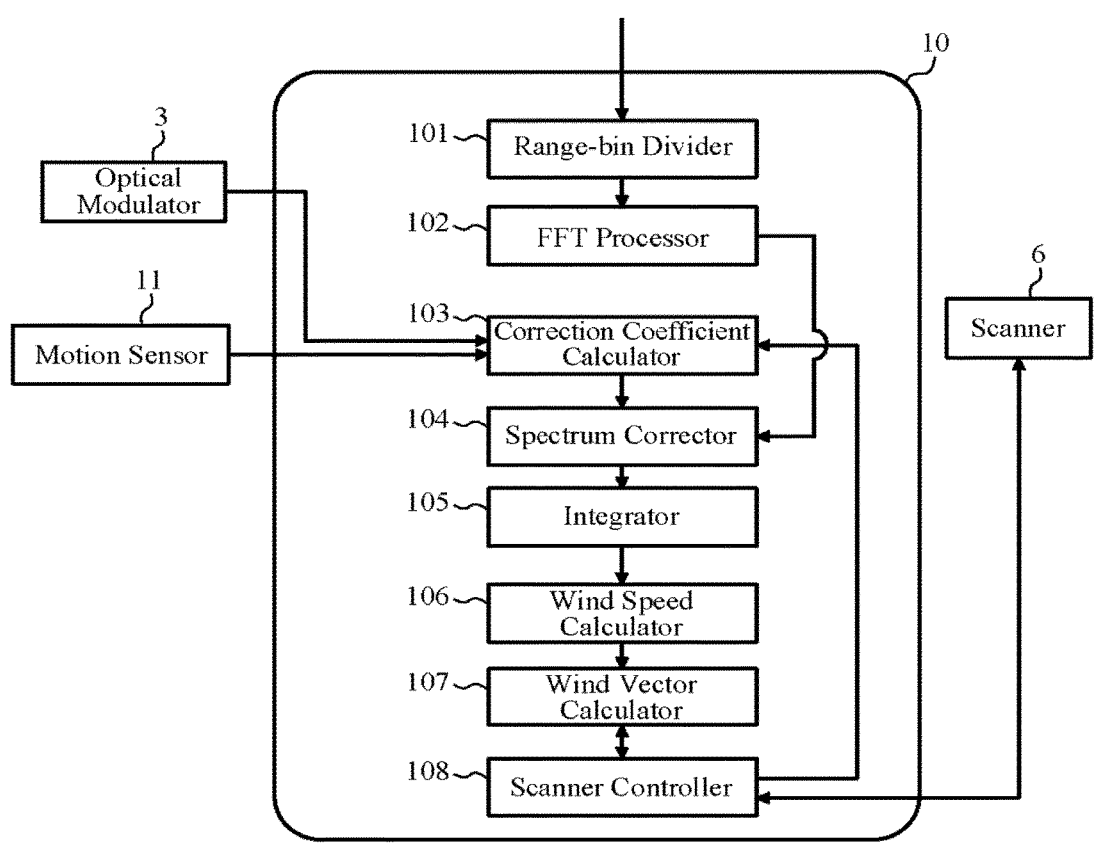
FIG. 2 is a block diagram showing an example of the configuration of signal processor 10 according to Embodiment 1 of the present disclosure.

FIG. 2 is a block diagram showing an example of the configuration of the signal processor 10 according to Embodiment 1 of the present disclosure.

The signal processor 10 includes a range-bin divider 101 (an example of a range-bin divider), an FFT processor 102 (an example of a fast Fourier transform processor), a correction coefficient calculator 103 (an example of a correction coefficient calculator), a spectrum correct 104 (an example of a spectrum corrector), an integrator 105 (an example of an integrator), a wind speed calculator 106 (an example of a wind speed calculator), a wind vector calculator 107 (an example of a wind vector calculator), and a scanner controller 108.

The range-bin divider 101 divides the digital signal outputted by the A/D converter 9 into an arbitrary number of range bins. The range-bin divider 101 is connected to the A/D converter 9 and the FFT processor 102. The range-bin divider 101 divides the digital signal outputted by the A/D converter 9, into an arbitrary number of range bins, and outputs the divided digital signal to the FFT processor 102. The division into the range bins means dividing a signal into signals having fixed time widths. For example, as the range-bin divider 101, a logic circuit which is an FPGA (Field Programmable Gate Array), a microcomputer, or the like is used.

The FFT processor 102 performs an FFT (Fast Fourier Transform) operation on the signal outputted by the range-bin divider 101. The FFT processor 102 is connected to the range-bin divider 101 and the correction coefficient calculator 103. The PET processor 102 performs a fast Fourier transform on the signal separated with the range bins outputted by the range-bin divider 101, on a per range-bin basis, and outputs the resulting spectrum signals to the spectrum corrector 104. For example, as the FFT processor 102, a logic circuit which is an FPGA, a microcomputer, or the like is used.

The correction coefficient calculator 103 acquires motion amounts acquired by the motion sensor 11, and calculates correction coefficients for correcting the motion. The correction coefficient calculator 103 is connected to the optical modulator 3, the motion sensor 11, the spectrum corrector 104, and the scanner 6. The correction coefficient calculator 103 is connected to the motion sensor 11 via an interface such as a USE (Universal Serial Bus), and acquires the motion outputted by the motion sensor 11. As an alternative, by requesting to acquire current motion amounts in response to a pulse trigger from the optical modulator 3, the correction coefficient calculator can acquire the motion amounts. The correction coefficient calculator 103 also acquires a signal showing the angle information, the signal being outputted by the encoder of the scanner 6. The correction coefficient calculator 103 calculates both a parameter for projecting a beam emission angle in a state of motion onto an ideal emitted beam direction, i.e., an emitted beam direction in a state of no motion, and a parameter for correcting the influence of the translational velocity of a platform, from both the motion amounts and the angle information, and outputs the calculated parameters to the spectrum corrector 104. Here, correction parameters are the projection coefficient and the shift coefficient which are outputted by the correction coefficient calculator 103. For example, as the correction coefficient calculator 103, a logic circuit which is an FPGA, a microcomputer, or the like is used.

The spectrum corrector 104 corrects the spectrum signals outputted by the FFT processor 102 by using the parameters calculated by the correction coefficient calculator 103. The spectrum corrector 104 is connected to the FFT processor 102, the correction coefficient calculator 103, and the integrator 105. The spectrum corrector 104 performs the motion compensation on the spectrum signal in each of the range bins, by correcting the spectrum signal in each of the range bins which is outputted by the FFT processor 102 by using the correction coefficients calculated by the correction coefficient calculator 103, and outputs the corrected spectrum data to the integrator 105. For example, as the spectrum corrector 104, a logic circuit which is an FPGA, a microcomputer or the like is used.

The integrator 105 integrates the spectrum signals. The integrator 105 is connected to the spectrum corrector 104 and the wind speed calculator 106. The integrator 105 performs integration operations on the spectra outputted by the spectrum corrector 104 an arbitrary number of times, and outputs a spectrum signal obtained by the integration operations, to the wind speed calculator 106. The integration operation is performed by integrating the spectrum signals in range bins of plural shots, for the same numbered range bins of the plural shots. For example, as the integrator, a logic circuit which is an FPGA, a microcomputer, or the like is used.

The wind speed calculator 106 calculates a wind speed from the integrated spectrum data. The wind speed calculator is connected to the integrator 105 and the wind vector calculator 107. The wind speed calculator 106 calculates a Doppler shift amount of the laser light from an integrated spectrum signal obtained by the integrator 105, and calculates a wind speed value with respect to the line-of-sight direction of the laser light from the Doppler shift amount. The wind speed calculator 106 outputs the wind speed value in each line-of-sight direction to the wind vector calculator 107. For example, as the wind speed calculator 106, a logic circuit which is an FPGA, a microcomputer, or the like is used.

The wind vector calculator 107 calculates a wind vector from both the wind speed values in line-of-sight directions and the angle information in each of the line-of-sight directions. The wind vector calculator 107 is connected to the wind speed calculator 106 and the scanner controller 108. The wind vector calculator 107 calculates a wind vector from both the wind speed value in each of line-of-sight directions which is outputted by the wind speed calculator 106, and the angle information about the prism which is read by the scanner controller 108, and outputs the wind vector to the scanner controller 108. For example, as the wind vector calculator 107, a logic circuit which is an FPGA, a microcomputer, or the like is used.

The scanner controller 108 generates a control signal for controlling the scanner 6. The scanner controller 108 is connected to the wind vector calculator 107, the correction coefficient calculator 103, the scanner 6, and the display device 12. The scanner controller 108 generates a control signal for changing the line-of-sight direction from the result of the wind vector which is calculated by the wind vector calculator 107, and outputs the generated control signal to the scanner 6. The scanner controller 108 holds the angle information acquired from the scanner 6, and also transmits the angle information to the correction coefficient calculator 103. The scanner controller 108 also outputs the result of the calculation of the wind vector which is outputted by the wind vector calculator 107 to the display device 12. For example, as the scanner controller 108, a logic circuit which is an FPGA, a microcomputer, or the like is used.

The explanation is returned to the configuration of the laser radar device shown in FIG. 1.

The motion sensor 11 measures the motion amounts of this laser radar device. The motion sensor 11 is connected to the signal processor 10. The motion sensor 11 acquires the motion amounts of the platform on which this laser radar device is mounted, and outputs the acquired motion amounts to the signal processor 10. The motion amounts are either values showing the angles in the directions of roll, pitch, and yaw of the platform, or values showing the translational velocities in the cardinal directions: north, east, south, and wrest, and the translational velocity in a vertical direction. For example, as the motion sensor 11, a gyro sensor using an accelerometer, or a GPS (Global Positioning System) gyro sensor is used.

The display device 12 displays the line-of-sight wind speed value calculated by the signal processor 10. The display device 12 is connected to the signal processor 10. The display device 12 displays the data calculated by the signal processor 10, e.g., the line-of-sight, wind speed value, the SNR of the line-of-sight wind speed value, or the wind vector. For example, as the display device 12, a liquid crystal display, an organic EL (Electro Luminescence) display, or the like is used. The display device 12 has a storage device such a RAM (Random Access Memory) or a hard disk, and can store the line-of-sight wind speed value, the SNR of the line-of-sight wind speed value, or the wind vector with respect to time.

Next, operations of the laser radar device according to Embodiment 1 of the present disclosure are explained below.

The optical oscillator 1 emits laser light, and outputs the laser light to the coupler 2.

The optical coupler 2 splits the laser light outputted by the optical oscillator 1 into transmission light and local light with an arbitrary splitting ratio, and outputs the transmission light to the optical modulator 3 and also outputs the local light to the mixing coupler 7. The transmission light is light to be outputted from the optical antenna 5 into the air, and the local light is light which is to be mixed with received light by the mixing coupler 7 that the optical receiver 8 performs heterodyne detection. The splitting ratio of the optical coupler 2 is determined by the system design.

To the calculation of lines for the system design, for example, the following equation is used.

[Equation 1]

$$SNR = P \cdot \beta \cdot K \cdot \frac{\eta_F}{\left(1 + \left(1 - \frac{L}{F}\right)^2 \left[\frac{\pi(A_c D)^2}{4\lambda L}\right]^2 + \left(\frac{A_c D}{2S_0}\right)^2\right)} \cdot \left[\frac{\lambda \pi D^2}{8hBL^2}\right] \sqrt{N} \quad (1)$$

$\beta$, K, and $S_0$ denote a backward scattering coefficient $(m^{-1}sr^{-1})$, an atmospheric transmissivity, and a coherence diameter (m) of scattered light, respectively, and these parameters representing atmospheric conditions cannot be controlled by the system. D, F, and N denote a beam diameter (m), a focusing distance (m), and the number of incoherent integrations (the number of times that an incoherent integration is performed), respectively, and these parameters can be changed in the system. h, $\lambda$, P, $\eta_r$, and B denote the Planck's constant (Js), a wavelength (m), a pulse energy (J) of the transmission light, an efficiency of far-field transmission and reception, and a reception bandwidth (Hz), respectively. Ac denotes an approximation coefficient for substituting a diffraction-limited Gaussian beam that is highly correlated with a Gaussian beam (NGB: Nearest Gaussian Beam) affected by optical vignetting at the optical antenna, and L denotes an observation distance (m). Optical vignetting means a state which a Gaussian beam for transmission or reception is limited by the effective aperture diameter of a telescope, and is partially clipped. The parameter Ac indicates a coefficient to be applied to a Gaussian curve when fitting of the clipped Gaussian beam with the Gaussian curve is performed.

The optical modulator 3 performs frequency modulation and intensity modulation on the transmission light after the splitting in the optical coupler 2, and outputs the modulated transmission light to the optical circulator 4. Here, the optical modulator 3 determines the pulse width and pulse repetition frequency (PRF) of the transmission light. Because the pulse width also corresponds to a distance resolution value, the pulse width corresponding to an intended distance resolution value can be set up in the signal processor 10, the signal processor 10 can set the pulse width to the optical modulator 3, and the optical modulator 3 can output the fixed pulse width and the PRF which are set up at the time of design. Further, when the light outputted by the optical modulator 3 is insufficient, an optical amplifier can be added as a stage following the optical modulator 3. The optical modulator 3 can shift the frequency of the transmission light by performing phase modulation on the transmission light. The optical modulator 3 outputs a pulse trigger signal showing a pulse timing when the transmission light is pulsed, to both the A/D converter 9 and the signal processor 10.

The optical circulator 4 allows the transmission light modulated by the optical modulator 3 to pass therethrough toward the optical antenna 5, and outputs received light received by the optical antenna to the mixing coupler 7. The optical circulator 4 separates the transmission light and the received light in this way.

The optical antenna 5 collimates the transmission light and emits the transmission light into the air. The optical antenna 5 also collects part of the transmission light scattered by aerosols and receives this scattered part as received light. The optical antenna 5 can have a condensing and adjusting function.

The scanner 6 receives a control signal outputted by the signal processor 10, and rotates the wedge prism to change arbitrarily the direction of the light emitted by the optical antenna 5. The scanner 6 also outputs an electric signal corresponding to encoder information to the signal processor 10, to transmit the angle information to the signal processor.

The mixing coupler 1 mixes the local light outputted by the optical coupler 2 and the received light outputted by the optical circulator 4, and outputs the resulting mixed light to the optical receiver 8.

The optical receiver 8 performs photoelectric conversion on the mixed light outputted by the mixing coupler 7, performs frequency demodulation on the received light by using heterodyne detection, and outputs the received signal which has been frequency-modulated, to the A/D converter 9.

The A/D converter 9 receives the pulse trigger signal generated in the optical modulator 3, and, after that, performs A/D conversion on the received signal outputted by the optical receiver 8 at a sampling frequency fs and outputs the digital signal to the signal processor 10.

The operations of the process 10 are explained below.

A block diagram of the signal processor 10 is shown in FIG. 2. As mentioned above, the laser radar device according to this embodiment uses a pulse method.

Figure 3:
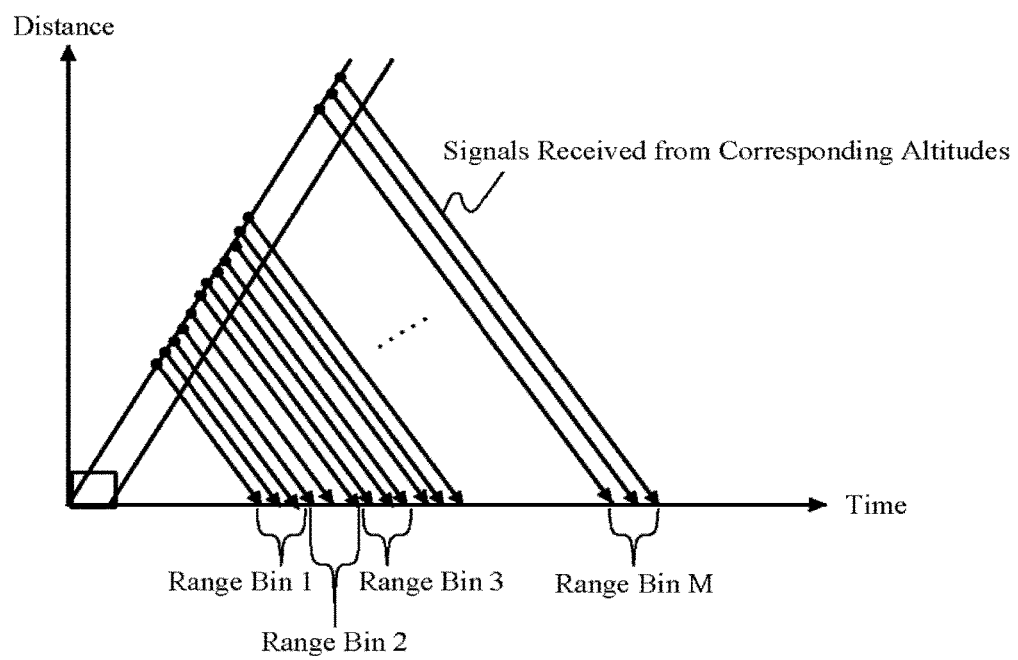
FIG. 3 is a diagram showing a relation between observation distances and reception times in the laser radar device according to Embodiment 1 of the present disclosure.

FIG. 3 is a diagram showing a relation between observation distances and reception times in the laser radar device according to Embodiment 1 of the present disclosure. The range-bin divider 101 divides signals received from corresponding distances by using any set time width. Hereafter, time intervals after division, i.e., distance sections after divisions are referred to as range bins. The range-bin divider 101 divides a received waveform into an arbitrary number of range bins, and outputs the voltages indicating received waveforms in the respective time intervals of the range bins, to the FFT processor 102.

For example, when the distance resolution Rres is set to 30 m, the time width with which temporal waveform on which the A/D conversion has been performed are divided can be set as t=2Rres/c (c: the speed of light). Therefore, in the case where the total number of range bins is M, when the separate time with each range bin is shown with respect to a trigger for starting the A/D conversion, i.e., here the trigger signal timing provided from the optical modulator 3, equations are given as follows.

[Equation 2]

$$Tstart(m) = (m-1)\left(\frac{Rres}{c}\right) + 2Rmin/c \quad (2)$$

[Equation 3]

$$Tend(m) = (m+1)\left(\frac{Rres}{c}\right) + 2Rmin/c \quad (3)$$

[Equation 4]

$$Tcen(m) = (m)\left(\frac{Rres}{c}\right) + 2Rmin/c \quad (4)$$

Tstart denotes a start time of data acquisition for each rang bin, Tend denotes an end time of data acquisition for each range bin, Tcen denotes a center time of data acquisition for each range bin, and m indicates a range bin and has a value ranging from 1 to M. Rmin denotes a value for adjusting a starting distance for observation, namely a distance value corresponding to the timing for the delay until the A/D conversion is performed in response to the pulse trigger signal. In a case in which the delay in the start of the A/D conversion in response to the trigger is 0, for example, when it is intended to perform a measurement starting from a distance of 40 meters, a value such as 40 is substituted into Rmin.

Here, although the division into the range bins with a regular time interval is performed, this embodiment is not limited to this example, and an observation start distance corresponding to Tstart can be determined by a user, an observation start distance corresponding to Tstart can be set for each of the range bins, and ranges between Tstart and Tend can be overlapped with each other.

The FFT processor 102 performs an FFT operation using the number (NFFT) of FFT bins on the temporal waveform in each of the range bins acquired by the range-bin divider 101, to acquire a received signal spectrum. NFFT denotes the number of points for use in the FFT operation. For example, a value such as 256 is used as NFFT. The received signal spectrum in this case corresponds to SPC (i, n, R) which is mentioned later.

The correction calculator 103 acquires the motion amounts which are outputted by the motion 11 at fixed time intervals. The correction coefficient calculator 103 also acquires the angle information from the scanner controller 108. The correction coefficient calculator 103 calculates the correction coefficients used for a spectrum correction to be performed at a following stage from the motion amounts and the angle information.

Although the correction coefficient calculator 103 can acquire the motion amounts by requesting the motion sensor 11 to acquire the motion amounts in response to the pulse trigger from the optical modulator 3, an operation of the motion compensation for the case of the acquisition of the motion amounts at fixed time intervals is described in the following embodiment.

Figure 4:
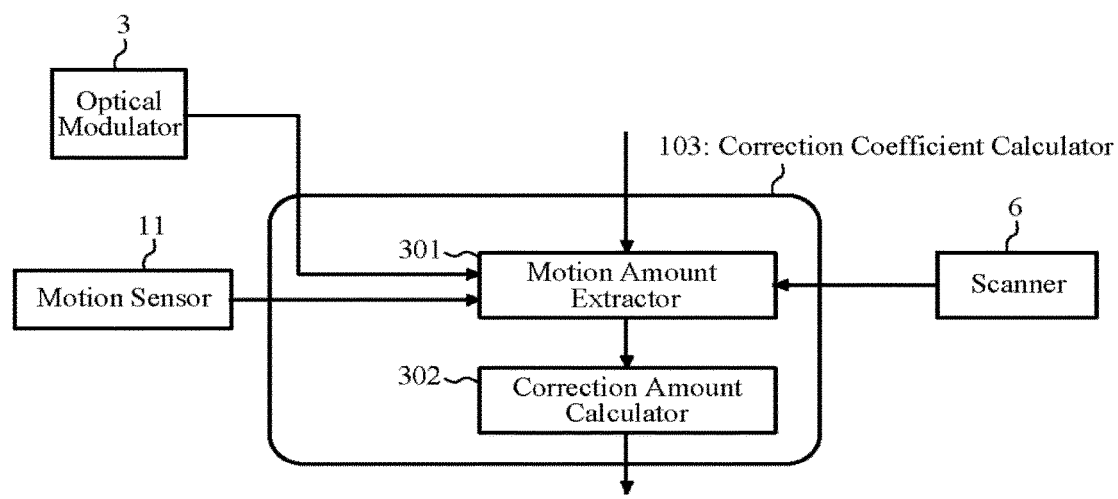
FIG. 4 is a diagram showing an example of the configuration of a correction coefficient calculator 103 according to Embodiment 1 of the present disclosure.

FIG. 4 is a diagram showing an example of the configuration of the correction coefficient calculator 103 according to Embodiment 1 of the present disclosure.

In order to calculate amounts for compensation for motion, a motion amount extractor 301 acquires the motion amounts from the motion sensor 11 and outputs the acquired motion amounts to the correction amount calculator 302. The motion sensor 11 outputs the motion amounts in the six degrees of freedom including the motion amounts in the directions of roll, pitch, and yaw, the motion amounts in the cardinal directions: north, east, south, and west, and the motion amount in a vertical direction, the angle of elevation (EL), the azimuthal angle (AZ) from north, and the translational velocities in the cardinal directions: north, east, south, and west and the translational velocity in a vertical direction to the motion amount extractor 301.

Figure 5:
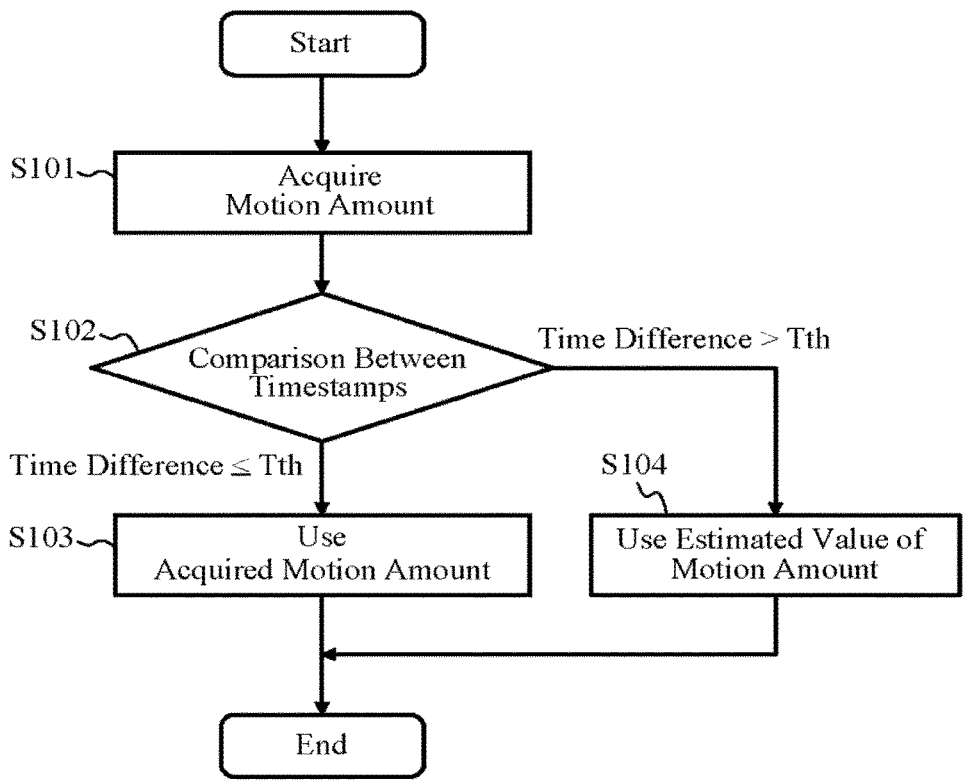
FIG. 5 is a flowchart showing an example of the operation of the motion amount extractor 301 according to Embodiment 1 of the present disclosure.

FIG. 5 is a flowchart showing an example of the operation of the motion amount extractor 301 according to Embodiment 1 of the present disclosure.

First, in step S101, the motion amount extractor 301 acquires a motion amount from the motion sensor 11, as mentioned above. It is assumed that a timestamp is included in the acquired motion amount.

Next, in step S102, the motion amount extractor 301 makes a comparison between the timestamp of the pulse trigger signal outputted by the optical modulator 3, and the timestamp included in the motion amount, to judge whether or not the resulting time difference is equal to or less than a threshold (Tth).

Next, when the time difference is equal to or less than the threshold (Tth), in step S103, the motion amount extractor 301 uses the acquired motion amount without modification to calculate the correction amount outputs the acquired motion amount to the correction amount calculator 302, and terminates the sequence.

In contrast, when the time difference is greater than the threshold (Tth), in step S104, the motion amount extractor 301 uses, for example, an estimated value of the motion amount, which is calculated using a Kalman filter. The motion amount extractor 301 outputs the estimated value of the motion amount to the correction amount calculator 302, and terminates the sequence. Instead of the operation of using the latest motion amount without modification, the motion amount extractor 301 can use an operation of storing spectrum data in advance, performing a linear interpolation using previous motion amounts when a motion amount is acquired, and extracting the resulting linearly-interpolated motion amount as a motion amount at the time when the optical modulator 3 outputs a pulse trigger signal.

The value of Tth can be determined in accordance with an expected degree of accuracy of motion compensation, and can be set to a fixed value by the user. Instead, an allowable beam angle difference (Ath) between PRFs can be set simultaneously, and the value of Tth can be dynamically determined using the following equation: Tth=Ath/(the preceding angular speed to [deg/sec] acquired at a previous time by the motion sensor), or the like. For example, in the case of use in an area such as the ocean, because a cycle of fluctuation in the angular speed at a previous time has the order of 1 Hz and is less than the PRF, the influence exerted on the accuracy is small even though the preceding angular velocity is used. As to the value of Ath, there is a method of determining the value from the specifications of the motion sensor. As a result, the acquisition of the motion amounts having a relatively high degree accuracy can be performed without using the motion sensor at a high sampling rate, and a reduction in the cost concerning the motion sensor can be achieved.

The correction amount calculator 302 calculates the correction amounts in the following way by using the acquired motion amounts. The correction parameters are the projection coefficient Pc and the shift amount T (Hz). When motion in the direction of the elevation angle is considered, the projection coefficient Pc is expressed by the following equation, where the elevation angle value in an ideal state in which no motion occurs is denoted by θa and the elevation angle value in a state in which motion has occurred is denoted by θb.

[Equation 5]

$$\text{if } \theta_b > \theta_a \ Pc = \sin(\theta_b - \theta_a) \text{ else } Pc = \frac{1}{\sin(\theta_b - \theta_a)} \quad (5)$$

The shift amount T is expressed by the following equation by using the translational velocity Vs acquired from the motion sensor 11. Hereafter, for the sake of simplicity, a case in which there is a translational motion in a single axis direction is shown below. λ denotes the wavelength of the transmission light.

[Equation 6]

$$T = Vs/\lambda \quad (6)$$

The method of deriving the projection coefficient or the shift amount is not limited to this example, and we can use any method of providing an equation or variable for making possible to perform a correction motion amounts at a time when no motion occurs.

The spectrum corrector 104 prepares an array for storing spectra for each of the motion amounts, and stores spectra corresponding to each of the motion amounts in the prepared array. Here, the spectra to be stored are spectrum data about a plurality of line-of-sight directions.

Figure 6:
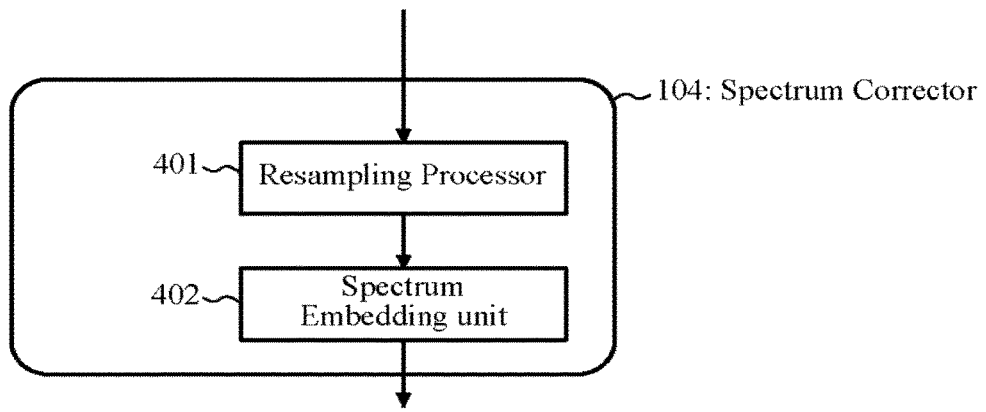
FIG. 6 is a block diagram showing an example of the configuration of a spectrum corrector 104 according to Embodiment 1 of the present disclosure.

FIG. 6 is a block diagram showing an example of the configuration of the spectrum corrector 104 according to Embodiment 1 of the present disclosure.

A resampling processor 401 changes the sizes of frequency bins to thereby change the frequency resolution in a pseudo manner, and also increases the total number of frequency bins.

Figure 7:
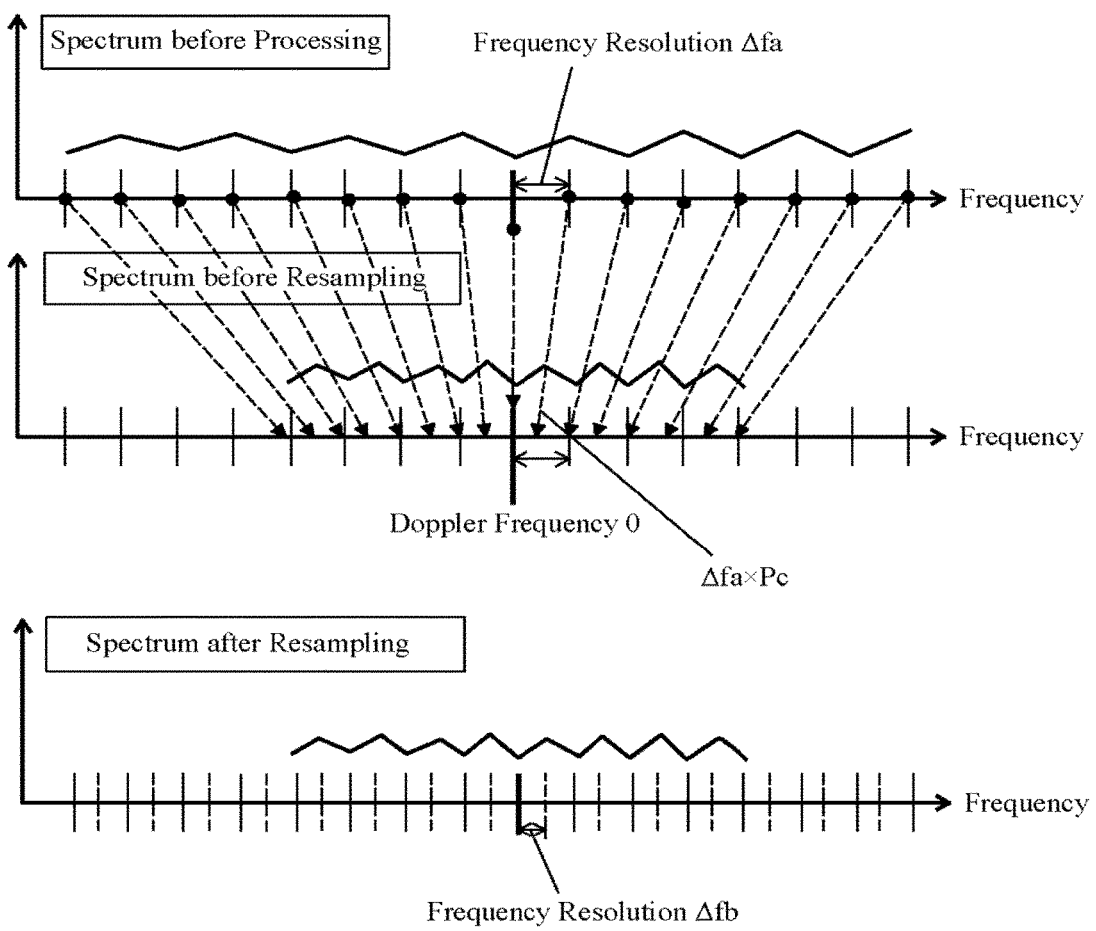
FIG. 7 is a conceptual diagram showing processing performed by a resampling processor 401 according to Embodiment 1 of the present disclosure.

FIG. 7 is a conceptual diagram showing processing performed by the resampling processor 401 according to Embodiment 1 of the present disclosure.

The resampling processor 401 multiplies the value in each of the frequency bins by the projection coefficient Pc, by using the projection coefficient outputted by the correction amount calculator 302, to calculate spectrum data in which the projection coefficient is corrected, and stores the spectrum data in the frequency bin. However, depending on the value of Pc, two data pieces can be stored in one frequency bin. When two or more data pieces are stored in each frequency bin, a method of using the average of the two or more data pieces is known. However, in this case, there occurs a problem in which the frequency resolution degrades. Therefore, the resampling processor 401 changes the size of each of the frequency bins and resamples the spectrum data, as shown in FIG. 7, thereby reducing the degradation in the frequency resolution. Hereafter, the resampling operation is explained in detail.

A change in the frequency bins can be performed by changing the total number of FFT points, or by directly changing the size of each of the frequency bins.

When the total number of FFT points is changed, the resampling processor 401 can change the size of each of the frequency bins by Changing the total number of FFT points by using a preset fixed value, or can use a motion amount acquired at the first shot at which a line-of-sight wind speed value is acquired, to change dynamically the total number of frequency bins by multiplying $Nfft_a$ by $1/\cos(|\theta a - \theta b|)$, as shown by $Nfft_b = Nfft_a \times 1/\cos(|\theta a - \theta b|)$, where $Nfft_a$ is the original total number of frequency bins and $Nfft_b$ is the total number of frequency bins after the change.

On the other hand, when the size of each of the frequency bins is changed, the resampling processor 401 changes the size of each of the frequency bins, as shown in, for example, the following equation: $\Delta fb = \Delta fa \times \cos(|\theta a - \theta b|)$, where the original size of each of the frequency bins is $\Delta fa$. Through this operation, reservation of an excessive number of FFT bins can be suppressed, and this can contribute to a reduction in the memory capacity.

The determination of the coefficient for changing the frequency bins can be performed at the first shot in the number N of integrations, and the coefficient can be fixed after that. Further, in a case in which there is a possibility that, in the platform, the θf on amount becomes larger than that at the first shot with respect to time, and a sufficient amount of memory can be ensured, spectra at the first through (N−1)-th shots can be stored and $Nfft_b$ can be determined using the motion amount (θbmax) at a time when the largest projection coefficient value is acquired up to the N-th shot, in the following way that the total number of frequency bins is multiplied by $1/\cos(|\theta a - \theta bmax|)$.

The spectrum embedding unit 402 performs calculations as described below to store the value of each spectrum data piece (SPC (i, n, R)) in an array of each frequency bin which is generated by the resampling processor 401, where i denotes the number of each frequency bin, i.e., a number showing the sequence number of a data piece among data pieces arranged in order of frequency, n denotes the shot number, and R denotes the range bin number. For example, SPC(i, 2) means spectrum data acquired for the second emission.

For example, each spectrum data piece (SPC(i, n, R)) is converted into SPCb(i, n, R)=Pc(n)×SPC(i, n, R) by using the projection coefficient Pc, and is stored in the array of each frequency bin which is generated by the resampling processor 401. Here, SPCb(i, n, R) denotes the spectrum data in which the projection angle is corrected, where i=1, 2, . . . , and $(Nfft_a) \times 1/\cos(|\theta a - \theta b|)$.

The integrator 105 performs an incoherent integration of spectra acquired at the plural shots a number of times (N times), this number being specified by the user. The incoherent integration of the spectrum data about each range bin is performed in accordance with an equation shown below.

Figure 8:
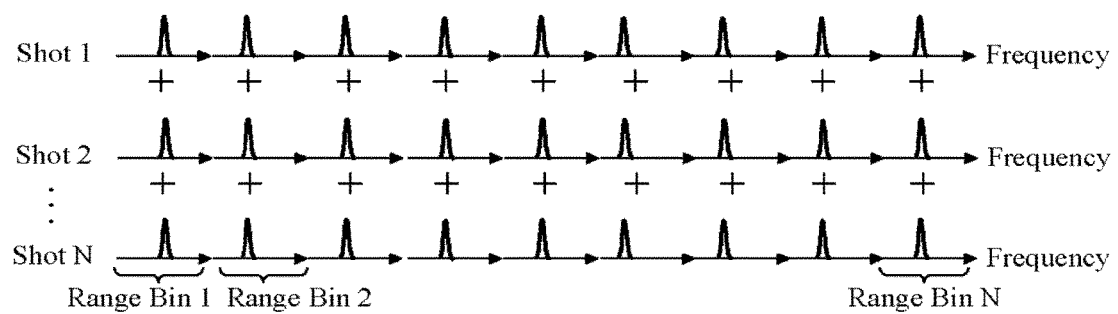
FIG. 8 is a conceptual diagram showing an integration operation performed by an integrator 105 according to Embodiment 1 of the present disclosure.

FIG. 8 is a conceptual diagram showing an integration operation performed by the integrator 105 according to Embodiment 1 of the present disclosure. As to the spectrum data about the respective range bins in the respective shots, the integrator 105 performs the integration operation by adding up the spectrum data pieces having the same range bin number. The integration operation is expressed as the following mathematical expression.

[Equation 7]

$$S(i, R) = \left(\sum_{n}^{N} SPC_b(i, n, R)\right) / N \quad (7)$$

i denotes the number of each frequency bin, n denotes the number of each shot, and R denotes the range bin number. SPCb denotes the spectrum data in which the projection angle is corrected. By performing the integration operation in this way, the peak value (signal value) of the spectrum data can be increased relative to the noise value. More specifically, the SNR can be improved.

Figure 9:
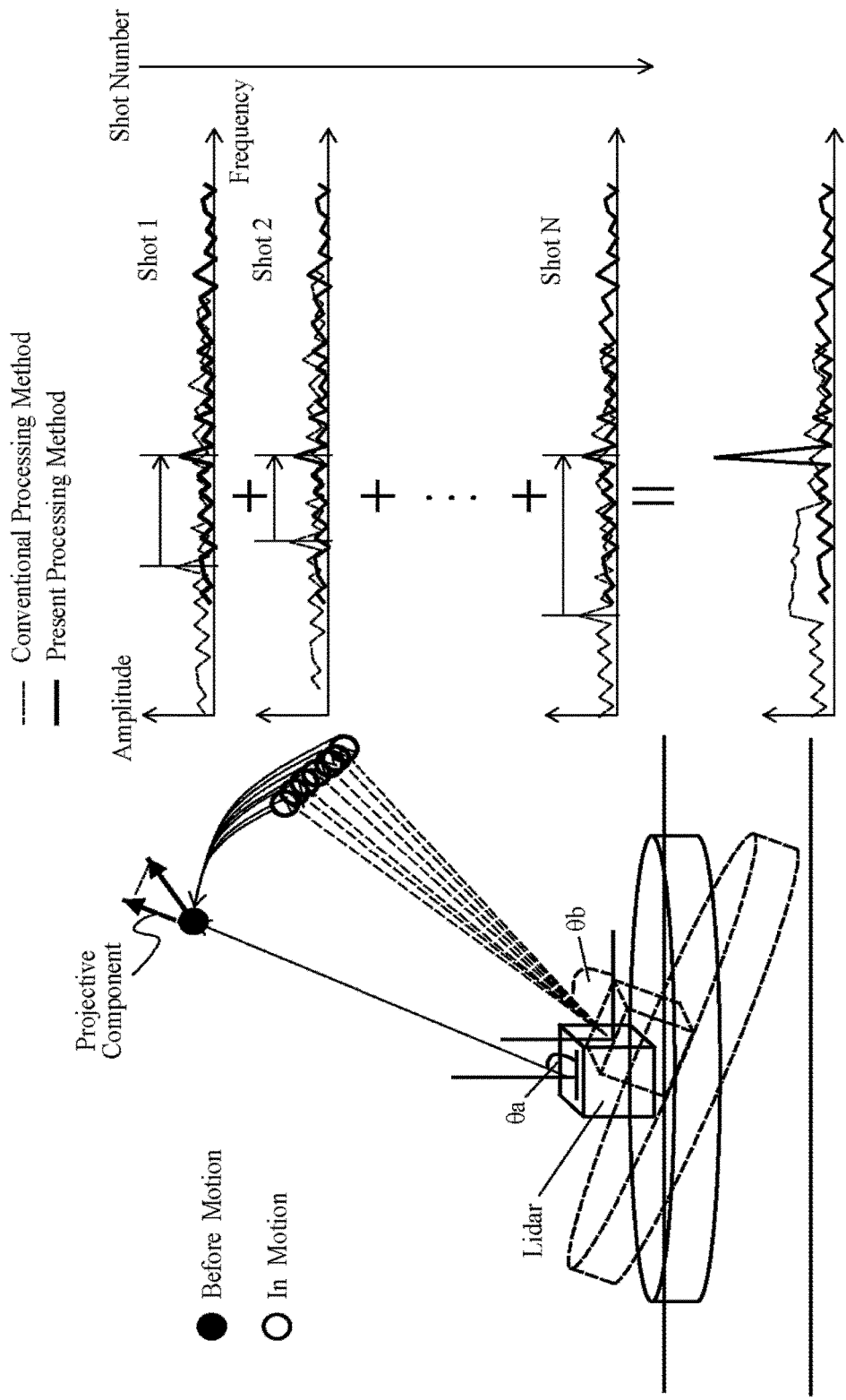
FIG. 9 is a conceptual diagram of an integration result obtained by the integrator 105 according to Embodiment 1 of the present disclosure.

FIG. 9 is a conceptual diagram of an integration result obtained by the integrator 105 according to Embodiment 1 of the present disclosure.

Each solid line shows a spectrum acquired using the present method, and each dotted line shows a spectrum acquired using a conventional method. At each shot, the signal value is small and the SNR is low. Further, when the projection coefficient is not corrected for each shot, the signal values are dispersed even if the spectrum data acquired at respective shots is integrated, because the frequency of the signal value differs for each shot. However, when the projection coefficient is corrected, the frequency of the signal value matches for each shot because the Doppler frequency caused by aerosols is constant. Therefore, by performing the integration operation, the noise values are averaged whereas the signal values are integrated. Thus the SNR can be improved.

An improvement in the SNR through the operations explained above is explained bellow in a little more detail.

Figure 10:
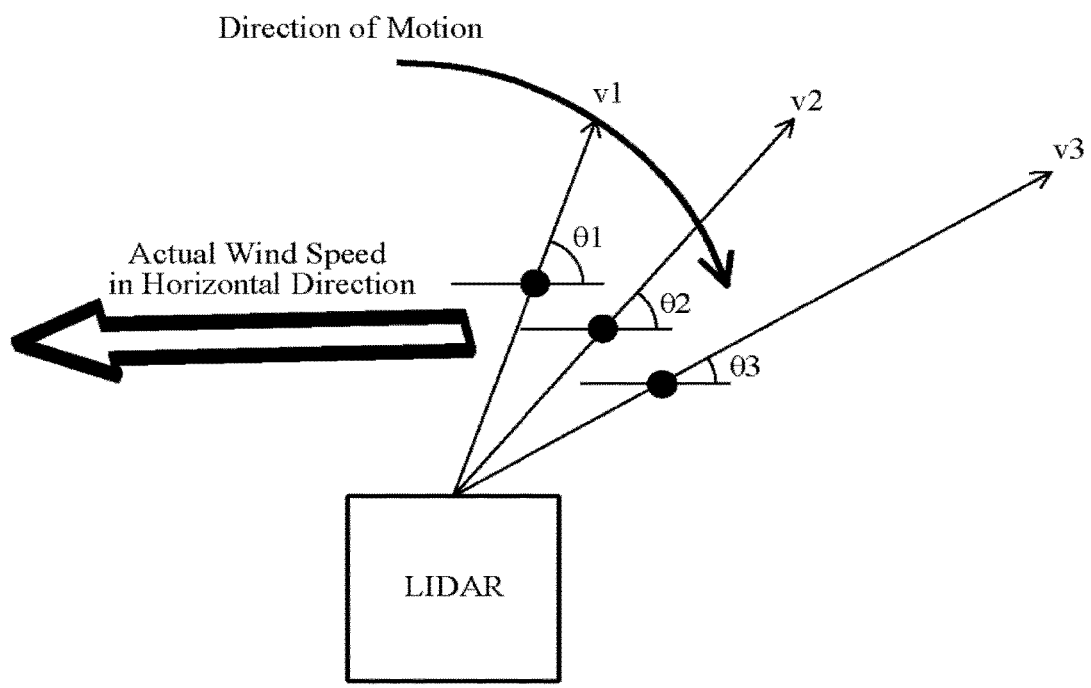
FIG. 10 is a relation diagram showing a relation between a wind speed and a deviation of the emission angle which is caused by the motion of the laser radar device according to Embodiment 1 of the present disclosure.

FIG. 10 is a relation diagram showing a relation between a wind speed and a deviation of the emission angle which is caused by the motion of the laser radar device according to Embodiment 1 of the present disclosure.

V denotes an actual wind speed in a horizontal direction, and θ1 to θ3 denote emission angles of the laser light. v1 to v3 denote wind speeds which are determined from results of the measurement in directions of θ1 to θ3, respectively.

The laser radar device calculates a wind speed by calculating a Doppler between the transmission light and light scattered from aerosols in the air. Therefore, because the velocity of the laser light relative to a wind including aerosols varies depending on the angle which the wind forms with the laser light, the Doppler shift varies.

In the example shown in FIG. 10, because the following relation: θ1>θ2>θ3 is established when no angle correction (motion compensation) is performed, the following relation: v3>v2>v1 is established, and various values are obtained for the actual wind speed V. Therefore, by assuming that the wind speed value differs depending on the angle and the angle varies with respect to time, the wind speed has a different value with respect to time even if the actual wind speed is constant. Therefore, even if the integration operation is performed with respect to time, the position of the peak does not match at each time, and the width of the peak becomes large.

Figure 11:
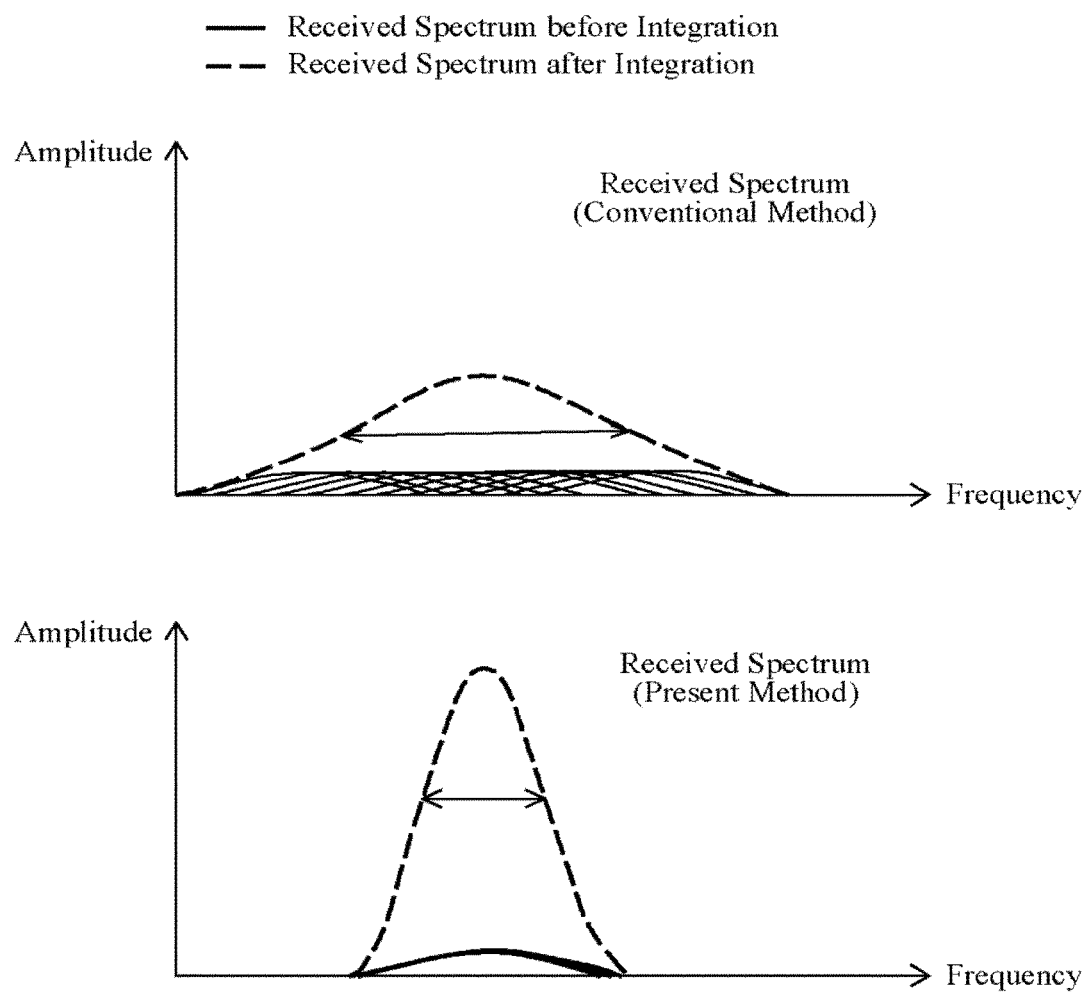
FIG. 11 is a diagram for comparison showing a comparison between an integration result obtained by a conventional method, and an integration result obtained by a present method.

FIG. 11 is a diagram for comparison showing a comparison between an integration result obtained by a conventional method, and an integration result obtained by the present method.

As mentioned above, in the conventional method, because a motion compensation is performed after the integration, the spectrum on which the integration is to be performed is a spectrum before the motion compensation. Therefore, the width of the peak of the resulting integrated spectrum becomes large. In contrast with this, in the present method, because the integration is performed after the motion compensation is performed, the width of the peak of the spectrum result becomes small, and the peak value becomes large.

Figure 12:
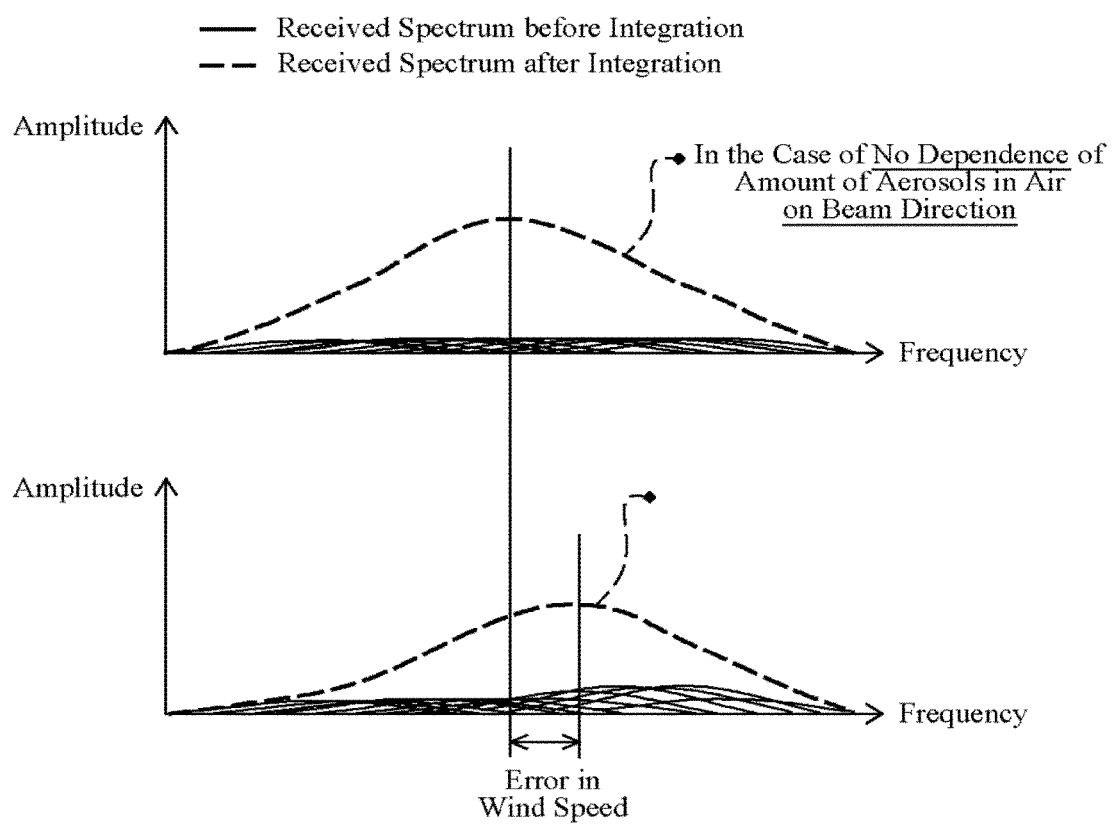
FIG. 12 is a diagram showing spectra in a case in which aerosols differ depending on the line-of-sight direction.

FIG. 12 is a diagram showing spectra in a case in which the amount of aerosols differs depending on the line-of-sight direction. In general, the following relation: the spectrum intensity ∝ the received SNR ∝ the amount of aerosols in the air is established. When the amount of aerosols in the air does not depend on the beam direction, the spectrum intensity serves as an index of a frequency, and the frequency at which the spectrum intensity has a peak as shown in an upper portion of FIG. 12 corresponds to the calculation of the average of frequencies. In this case, because in the conventional configuration, the average of motion amounts within a time period during which the spectrum integration is performed is used, a correction having a high degree of accuracy can be performed by performing a correction using an average wind speed value and the average motion amount.

However, it is different from actual states. Since the amount of aerosols depending on the beam direction, the received intensity differs depending on the frequency, i.e., the wind speed value, and is as shown in a lower portion of FIG. 12, and the motion amount does not take into consideration the influence of the difference. Therefore, the frequency at which a peak value exists is dragged toward a direction corresponding to a larger amount of aerosols, i.e., a direction corresponding to a higher received intensity, and this results in the occurrence of an error in wind speed after the motion compensation. This is a phenomenon caused by the motion compensation that is performed after the integration. According to the present configuration, because the integration is performed while the spreading spectrum is concentrated at the same position, an advantage of allowing for the great reduction of the correction error generated due to the dependence of the amount of aerosols in the air on the beam direction is obtained.

The wind speed calculator 106 calculates the Doppler frequency in the line-of-sight direction, namely the value of the wind speed from the integrated spectrum. The calculation of the Doppler frequency can be formed by not only performing detection of the peak of the spectrum, but also using the calculation of the centroid. The calculation of the Doppler frequency fd by using the calculation of the centroid is expressed by the following equation.

[Equation 8]

$$fd = \frac{\int S(f)f}{\int S(f)} \quad (8)$$

S(f) denotes the spectrum of the received signal for a range bin (R), and S(f)=S(i, R). Further, f denotes the frequency corresponding to the number (i) of each frequency bin. Weighting is performed on the received spectrum with the frequency f. As a result, a frequency value which is most statistically significant can be calculated.

The wind vector calculator 107 calculates a wind vector by using vector combining or a VAD (Velocity Azimuth Display) method. In the case of using the vector combining, for example, by using the horizontal wind speed (U) in the east-west direction, the horizontal wind speed (V) in the north-south direction, the wind speed (W) in the vertical direction, the elevation angle (θ), and the azimuth angle (φ) relative to north, the wind speed (Vr) in the line-of-sight direction is expressed by the following equation.
[Equation 9]

$$Vr = U \sin\phi \sin\theta + V \cos\phi \sin\theta + W \cos\theta \quad (9)$$

For example, when the values of the wind speeds in three line-of-sight directions are acquired using the above equation U, V, and W can be calculated by solving simultaneous equations. As a result, a three-dimensional wind vector is acquired.

The scanner controller 108 generates a control signal for operating the scanner in order to change the line-of-sight direction. The scanner 6 drives the stepping motor disposed in the scanner in accordance with the control signal from the scanner controller 108, to cause the stepping motor to perform an intended stepping operation, thereby performing an operation of shifting to an intended angle. The scanner 6 also transmits an angle signal provided by the encoder mounted therein to the scanner controller 108, and the scanner controller 108 holds the angle information about the angle after the operation. This angle information corresponds to the above-mentioned ideal elevation angle value θ.

The display device 12 stores in a memory information including the value of the line-of-sight wind speed, the SNR of the value of the line-of-sight wind speed, or the wind vector, which has been calculated by the signal processor 10, and displays the information.

As described above, according to Embodiment 1 of the present disclosure, the motion compensation is performed before the integration operation is performed, and the integration operation is performed on the spectra on which the motion compensation is performed, the degradation in the SNR can be suppressed even though the motion amounts change with respect to time. As a result, the accuracy of the wind measurement can be improved.

Although the configuration according to this embodiment is described on the assumption that the laser radar device is a pulse type one, a CW (Continuous Wave) method can be used and this embodiment is not limited to the configuration. Further, although the configuration according to this embodiment is described on the assumption that an optical connection method based on optical fibers used, a connection method of space propagation type without using any optical fiber can be alternatively used.

In addition, the laser radar device according to this embodiment can have, instead of the above-mentioned scanner configuration, a configuration using an optical switch.

Figure 13:
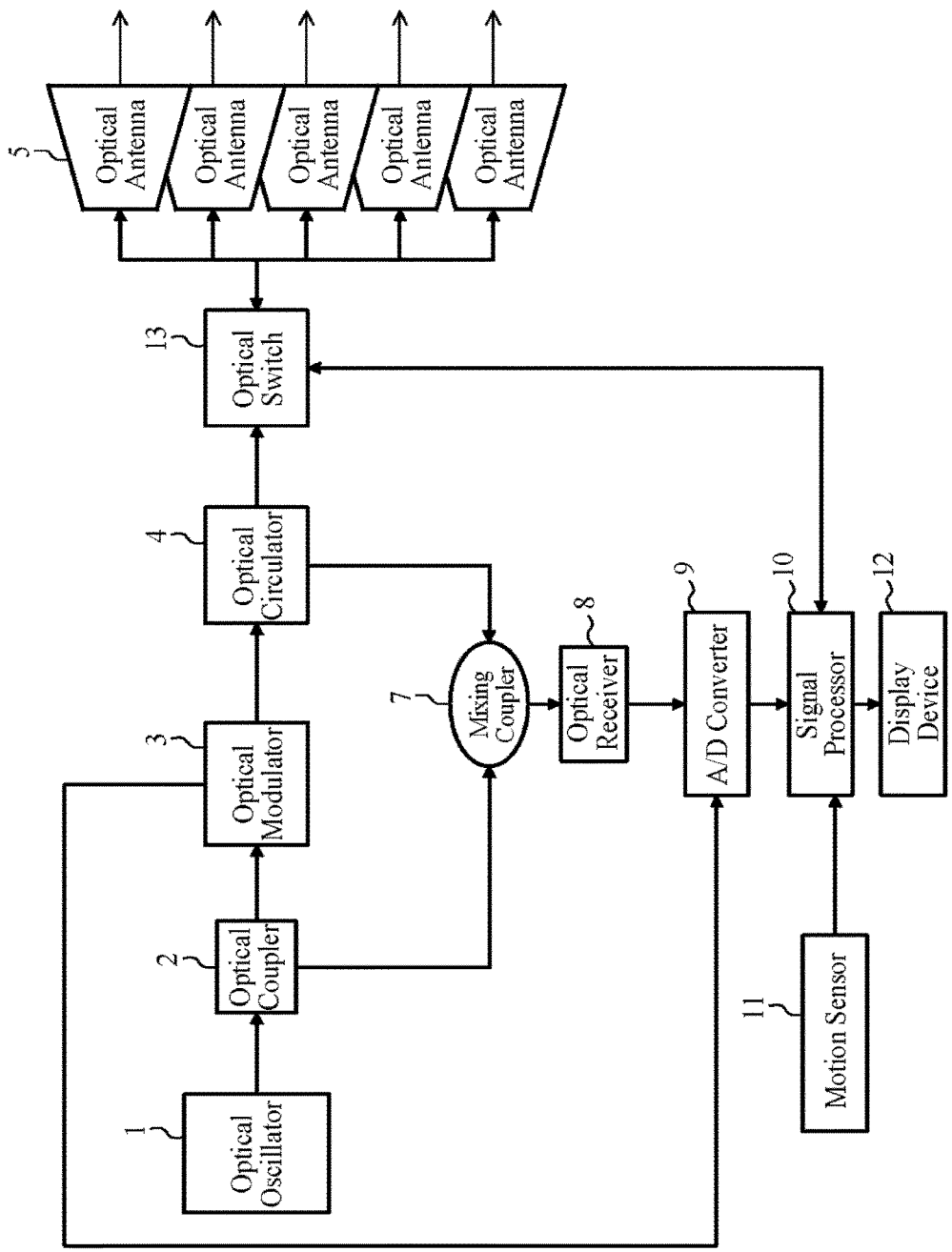
FIG. 13 is a block diagram showing another example of the configuration according to Embodiment 1 of the present disclosure.

FIG. 13 is a block diagram showing another example of the configuration according to Embodiment 1 of the present disclosure.

The optical switch 13 switches among light paths of the transmission light to be connected to each of optical antennas 5 at the front-end stage which have different line-of-sight directions, thereby making it possible to acquire the values of the wind speeds in the line-of-sight directions. For example, as the optical switch 13, a mechanical optical switch, a MEMS (Micro Electro Mechanical Systems) optical switch, or the like which is used for communications is used.

Further, the function of each of the components of the signal processor 10 can be implemented by hardware such as an FPGA, or can be implemented by software in such a way that a processor reads and executes a program stored in a memory and describing the function of each of the components.

Embodiment 2

In Embodiment 2, a laser radar device explained below, which shifts range bins in accordance with motion amounts, and changes regions with which a received signal is to be divided into range bins. As a result, an error in an observation altitude which is caused by motion can be suppressed, and the accuracy of wind measurement can be improved.

Figure 14:
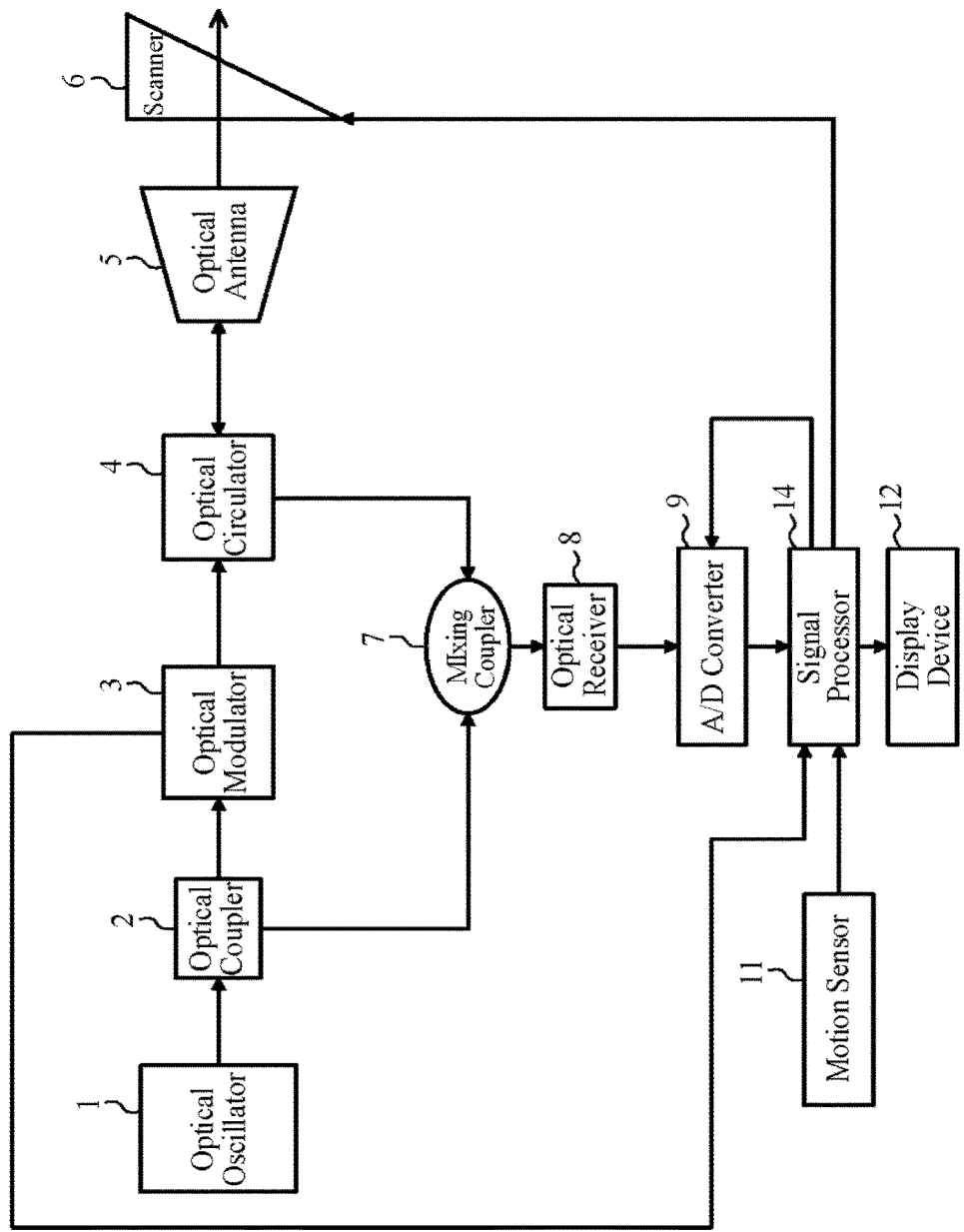
FIG. 14 is a block diagram showing an example of the configuration of a laser radar device according to Embodiment 2 of the present disclosure.

FIG. 14 is a block diagram showing an example of the configuration of a laser radar device according to Embodiment 2 of the present disclosure.

In FIG. 14, the same reference numerals as those shown in FIG. 1 denote the same components or like components. The laser radar device according this embodiment includes an optical oscillator 1, an optical coupler 2, an optical modulator 3, an optical circulator 4, an optical antenna 5, a scanner 6, a mixing coupler 7, an optical receiver 8, an A/D converter 9, a signal processor 14, a motion sensor 11, and a display device 12. The signal processor 14 is used instead of the signal processor 10, and a connecting relationship between the A/D converter 9 and the signal processor 14 differs that shown in Embodiment 1. As is mentioned later, signals outputted by the signal processor 14 are inputted to the A/D converter 9 at one time, and signals outputted by the A/D converter 9 are inputted to the signal processor 14 again.

Figure 15:
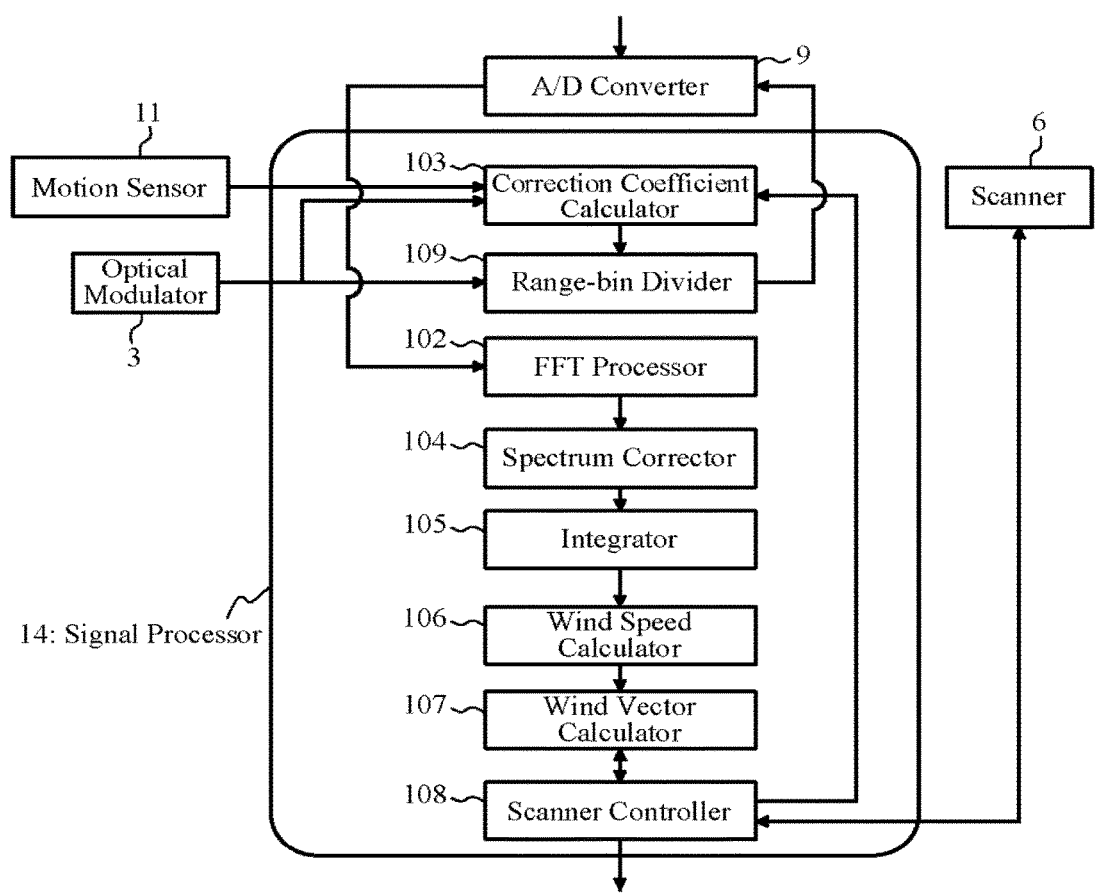
FIG. 15 is a block diagram showing an example of the configuration of a signal processor 14 according to Embodiment 2 of the present disclosure.

FIG. 15 is a block diagram showing an example of the configuration of the signal processor 14 according to Embodiment 2 of the present disclosure.

In FIG. 15, the same reference numerals as those shown in FIG. 3 denote the same components or like components.

The signal processor 14 includes a correction coefficient calculator 103, a range-bin divider 109, an FFT processor 102, a spectrum corrector 104, an integrator 105, a wind speed calculator 106, a wind vector calculator 107, and a scanner controller 106. The correction coefficient calculator 103 is disposed as a stage preceding the range-bin divider 109, and the signal processor 14 differs from the signal processor 10 in that the signal processor divides range bins after calculating correction coefficients for the motion amounts, and outputs range bins after division to the A/D converter 9, and signals on which A/D conversion is performed on the basis of the range bins are inputted to the FFT processor 102.

The range-bin divider 109 changes the size of each of the range bins in accordance with the motion amounts. The range-bin divider 109 is connected to the optical modulator 3, the correction coefficient calculator 103, and the FFT processor 102. The range-bin divider 109 outputs an A/D conversion start timing of each of the range bins to the A/D converter 9 in accordance with the motion amounts which are acquired via the correction coefficient calculator 103. The A/D converter 9 is connected to the range-bin divider 109 and the FFT processor 102, and outputs a digital signal in each of the range bins after the A/D conversion to the FFT processor 102. For example, as the range-bin divider 109, an FPGA, a microcomputer, or the like is used.

Next, operations of the laser radar device according to Embodiment 2 of the present disclosure are explained below. The explanation of the same operation as that shown in Embodiment 1 is omitted hereafter, and operations different from that shown in Embodiment 1 are explained below.

Because the operations of the components from the optical oscillator 1 to the optical receiver 8 are the same as those according to Embodiment 1, the explanation of the operations is omitted hereafter.

The A/D converter 9 converts an analog signal outputted by the optical receiver 8 into a digital signal. At that time, the A/D converter performs the conversion in response to each trigger signal outputted by the range-bin divider 109.

The range-bin divider 109 acquires the motion amounts from the motion sensor 11 via the correction coefficient calculator 103. The range-bin divider 109 then performs an operation to shift the regions with which a received signal is to be divided into range bins, by a length corresponding to an altitude deviation from an intended observation altitude due to motion, by performing operations as described below.

Figure 16:
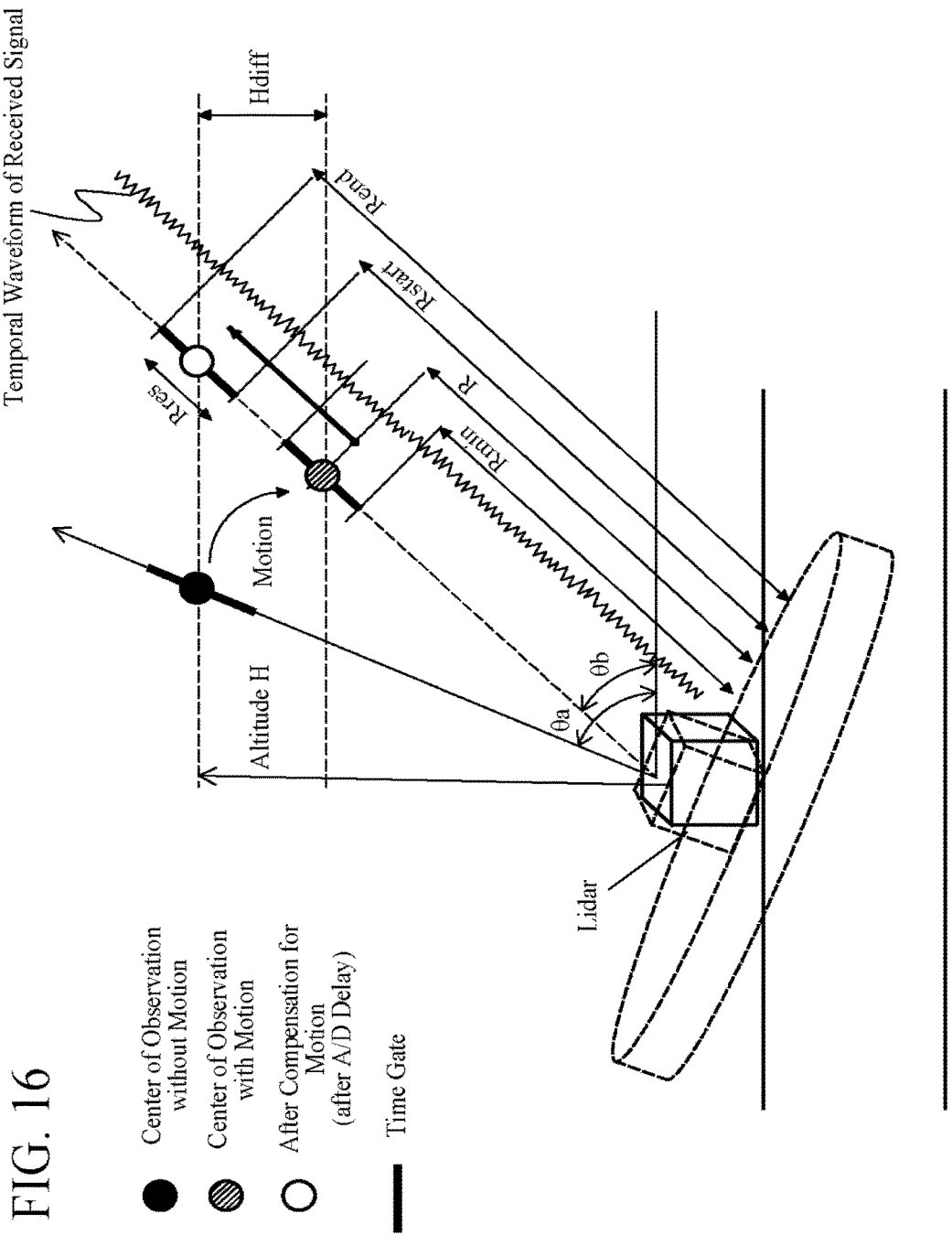
FIG. 16 is a mimic diagram showing that an observation altitude deviates due to motion.

FIG. 16 is a mimic diagram showing that the observation altitude is caused to deviate due notion.

θa denotes an elevation angle value in an ideal state without motion, and θb denotes an elevation angle value in a state in which motion has occurred. When motion in an elevation angle direction (a direction of EL) is considered, even though the laser radar device shown in FIG. 16 emits laser light in a direction of θa, the device actually emits laser light in a direction of θb when motion occurs at that time. Because the set angle differs from the angle at which laser light is actually emitted, a deviation is generated in the observation altitude even when the observation distance is the same. When a deviation is generated in the observation altitude, an error is generated in the observed wind speed, as is mentioned below.

Figure 17:
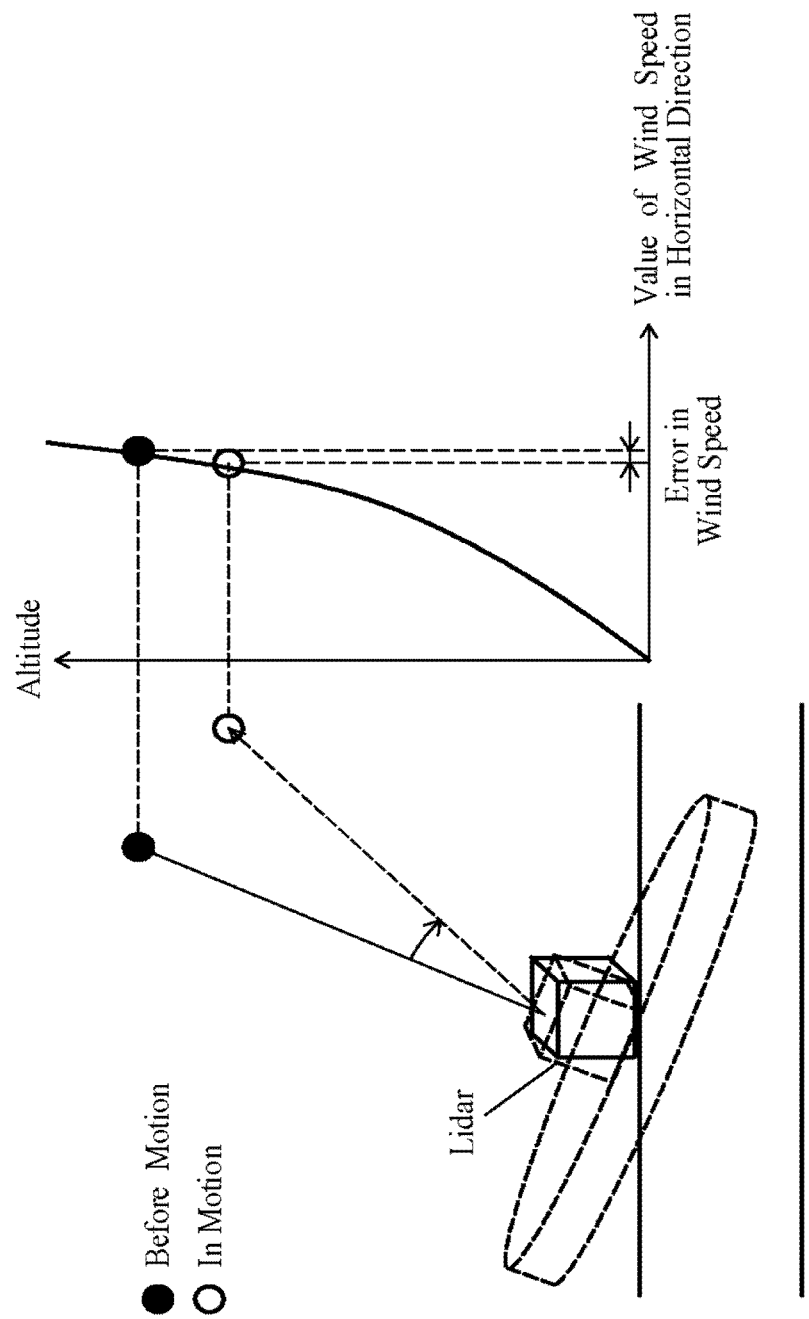
FIG. 17 is a relation diagram showing a relation between the observation altitude and a wind speed value.

FIG. 17 is a relation diagram showing a relation between the observation altitude and a value of the wind speed.

In general, a relation between a value of the horizontal wind speed and an altitude is expressed by a power law, as shown in FIG. 17. Therefore, the occurrence of a difference in the observation altitude corresponds to a wind measurement error.

When motion at θa>θb in the direction of EL is considered, in order to correct the difference in the altitude which is caused by the motion, for example, a start time (Tstart) and an end time (Rend) of each range bin are expressed by the following equations.

[Equation 10]

$$Tstart(m) = \frac{2Rstart}{c} \quad (10)$$

[Equation 11]

$$Rstart(m) = R(m) + \frac{Hdiff(m)}{\sin\theta_b} - \frac{Rres}{2} \quad (11)$$

[Equation 12]

$$Hdiff(m) = \left\{ Rmin + \frac{(m-1)Rres}{2} \right\}(\sin\theta_a - \sin\theta_b) \quad (12)$$

[Equation 13]

$$Tend(m) = \frac{2Rend}{c} \quad (13)$$

[Equation 14]

$$Rend(m) = R(m) + \frac{Hdiff(m)}{\sin\theta_b} + Rres/2 \quad (14)$$

As shown in FIG. 16. c denotes the speed of light, Hdiff denotes the difference between the observation altitude when no motion occurs and the observation altitude when motion occurs, and Rres denotes the size of each time gate, i.e., the width of each range bin. Rmin denotes a distance (gate start distance) corresponding to a time at which each time gate is started when motion occurs, R, denotes a distance to the center of observation before correction when motion occurs (an observation-center-distance before correction), and m denotes a range bin number. Rstart denotes a distance corresponding to a time at which each time gate is started when the observation altitude is corrected (a corrected gate start distance), and Rend denotes a distance corresponding to a time at which each time gate is ended when the observation altitude is corrected (a corrected gate end distance).

The laser radar device according to this embodiment corrects the deviation of the observation altitude by correcting the start time and the end time of each of the range bins by using the motion amounts, and measures a wind speed at the same observation altitude as that at the time when no motion occurs. As a result, even though motion occurs, the observation altitude can be kept constant, and an error in the wind measurement which is caused by the difference in the observation altitude can be reduced.

While the laser radar device according to Embodiment 1 determines the range bins with respect to the reception time, the laser radar device according to Embodiment 2 differs from the laser radar device according to Embodiment 1 in that the laser radar device according to Embodiment 2 determines the range bins with respect to the observation altitude.

The range-bin divider 109 outputs an A/D start signal corresponding to each of the range bins in which the observation altitude is corrected as explained above the A/D converter 9.

The A/D converter 9 performs A/D conversion of the received signal inputted from the optical receiver 8 in accordance with the time intervals of range bins, which are inputted from the range-bin divider 109, and outputs the converted received signal to the FFT processor 102.

Because the operation of the FFT processor 102 and subsequent operations are the same as those shown in Embodiment 1, the explanation of the operations is omitted hereafter.

As described above, since the laser radar device according to Embodiment 2 of the present disclosure changes the regions with which a received signal is to be divided into range bins, in accordance with the motion amounts, an effect of allowing for consistency in the observation altitudes and improvement in the accuracy of the wind measurement is achieved.

REFERENCE SIGNS LIST

1: optical oscillator; 2: optical coupler; 3: optical modulator; 4: optical circulator; 5: optical antenna; 6: scanner; 7: mixing coupler; 8: optical receiver; 9: A/D converter; 10: signal processor; 11: motion sensor; 12: display device; 13: optical switch; 14: signal processor; 101: range-bin divider; 102: FFT processor; 103: correction coefficient calculator; 104: spectrum corrector; 105: integrator; 106: wind speed calculator; 107: wind vector calculator; 109: scanner controller; 109: range-bin divider; 301: motion amount extractor; 302: correction amount calculator; 401: resampling processor; and 402: spectrum embedding unit.

The invention claimed is:

1. A laser radar device comprising:
an optical oscillator to emit laser light;
an optical modulator to modulate the emitted laser light;
an optical antenna to emit the modulated laser light into air, and to receive, as received light, scattered light scattered by an irradiation target in the air;
an optical receiver to perform heterodyne detection on the received light;
a sensor to detect one or more motion amounts of the optical antenna; and
a signal processor configured to:
calculate spectra of respective received signals obtained by the heterodyne detection performed by the optical receiver,
correct the calculated spectra by using the one or more motion amounts detected by the sensor,
perform an integration of the corrected spectra, and
calculate a speed of the irradiation target from a spectrum resulting from the integration.

2. The laser radar device according to claim 1, wherein the signal processor includes:
a range-bin divider to determine range bins for received signals obtained by the heterodyne detection performed by the optical receiver, by using the one or more motion amounts detected by the sensor, to thereby compensate for an error generated in an observation altitude due to motion;
an analog-to-digital converter to convert the received signals into digital signals, on a basis of the determined range bins;
a fast Fourier transform processor configured to perform a Fourier transform on the digital signals in each of the determined range bins to calculate spectra of the digital signals in the respective determined range bins;
a correction coefficient calculator to calculate a parameter for projecting direction of emission of the laser light in a state of motion onto a direction of emission in a state of no motion by using the one or more motion amounts detected by the sensor;
a spectrum corrector to correct the spectra calculated by the fast Fourier transform processor, by using the calculated parameter;
an integrator to integrate the corrected spectra with respect to the respective determined range bins; and
a wind speed calculator to calculate a Doppler shift component caused by the irradiation target from the integrated and corrected spectra, and calculate a wind speed of the irradiation target from the calculated Doppler shift component.

3. The laser radar device according to claim 1, wherein:
the optical modulator outputs a pulse trigger signal indicating a pulse timing when modulating the laser light emitted by the optical oscillator into pulses,
the motion amount detected by the sensor includes a timestamp, and
the signal processor is further configured to compare the pulse trigger signal outputted by the optical modulator with the timestamp of the motion amount, and determine the motion amount for use in the correction of the spectra of the received signals.

4. The laser radar device according to claim 3, wherein, when a time difference between the pulse trigger signal outputted by the optical modulator and the timestamp of the motion amount is greater than a predetermined threshold, the signal processor uses an estimated value of the motion amount in the correction of the spectra of the received signals.

5. A laser radar device comprising:
an optical oscillator to emit laser light;
an optical modulator to modulate the emitted laser light;
an optical antenna to emit the modulated laser light into air, and to receive, as received light, scattered light scattered by an irradiation target in the air;
an optical receiver to perform heterodyne detection on the received light;
a sensor to detect one or more motion amounts of the optical antenna; and
a signal processor configured to calculate spectra of respective received signals obtained by the heterodyne detection performed by the optical receiver, correct the calculated spectra by using the one or more motion amounts detected by the sensor, perform an integration of the corrected spectra, and calculate a speed of the irradiation target from a spectrum resulting from the integration,
wherein the signal processor includes:
a range-bin divider to divide the respective received signals into range bins;
a fast Fourier transform processor configured to perform a Fourier transform on received signals in each of the range bins obtained by the range-bin divider to calculate spectra of received signals in the respective range bins;
a correction coefficient calculator to calculate a parameter for projecting a direction of emission of the laser light in a state of motion onto a direction of emission in a state of no motion by using the motion amount detected by the sensor;
a spectrum corrector to correct the spectra calculated by the fast Fourier transform processor, by using the calculated parameter;
an integrator to integrate the corrected spectra with respect to the respective range bins; and
a wind speed calculator to calculate a Doppler shift component caused by the irradiation target from the integrated and corrected spectra, and calculate a wind speed of the irradiation target from the calculated Doppler shift component.

6. The laser radar device according to claim 5, further comprising a scanner to change a line-of-sight direction of the laser light emitted by the optical antenna,
wherein the signal processor includes a wind vector calculator to calculate a wind vector from wind speed values, calculated by the wind speed calculator, in a plurality of line-of-sight directions.

* * * * *